(12) United States Patent
Webster et al.

(10) Patent No.: US 8,322,987 B2
(45) Date of Patent: Dec. 4, 2012

(54) COOLING ARRANGEMENT

(75) Inventors: Adrian J. Webster, Belper (GB); Roderick M. Townes, Derby (GB); Ian Tibbott, Lichfield (GB)

(73) Assignee: Rolls-Royce PLC, London (GB)

( * ) Notice: Subject to any disclaimer, the term of this patent is extended or adjusted under 35 U.S.C. 154(b) by 629 days.

(21) Appl. No.: 12/457,585

(22) Filed: Jun. 16, 2009

(65) Prior Publication Data

US 2010/0040480 A1 Feb. 18, 2010

(30) Foreign Application Priority Data

Jun. 17, 2008 (GB) .................................. 0810986.0

(51) Int. Cl.
*F04D 29/58* (2006.01)

(52) U.S. Cl. .................................. 416/96 R; 416/97 R

(58) Field of Classification Search ................ 416/96 R, 416/97 R, 96 A, 97 A; 415/115
See application file for complete search history.

(56) References Cited

U.S. PATENT DOCUMENTS

| 4,770,608 | A | * | 9/1988 | Anderson et al. ........... 416/97 R |
| 5,498,133 | A | | 3/1996 | Lee |
| 5,690,473 | A | * | 11/1997 | Kercher ...................... 416/97 A |
| 5,813,836 | A | | 9/1998 | Starkweather |
| 2005/0265837 | A1 | | 12/2005 | Liang |
| 2006/0056967 | A1 | | 3/2006 | Liang |
| 2007/0286729 | A1 | * | 12/2007 | Kopmels ..................... 416/97 R |

FOREIGN PATENT DOCUMENTS

| EP | 1 939 400 A2 | 7/2008 |
| GB | 2 184 492 A | 6/1987 |
| GB | 2 314 126 A | 12/1997 |
| GB | 2 441 771 A | 3/2008 |

* cited by examiner

Primary Examiner — Dwayne J White
(74) Attorney, Agent, or Firm — Oliff & Berridge, PLC

(57) ABSTRACT

With regard to cooling turbine blades in a gas turbine engine a compromise has to be made between convective cooling within the inner cavity defining a flow path for coolant and the blow rates for developing film cooling on an outer surface of the aerofoil. By providing a chamber between the flow cavity and external apertures reconciliation between the necessary flow rates for convective cooling within the cavity defining the pathway for coolant flow within the aerofoil and the necessary coolant blowing rate for film development can be achieved.

11 Claims, 4 Drawing Sheets

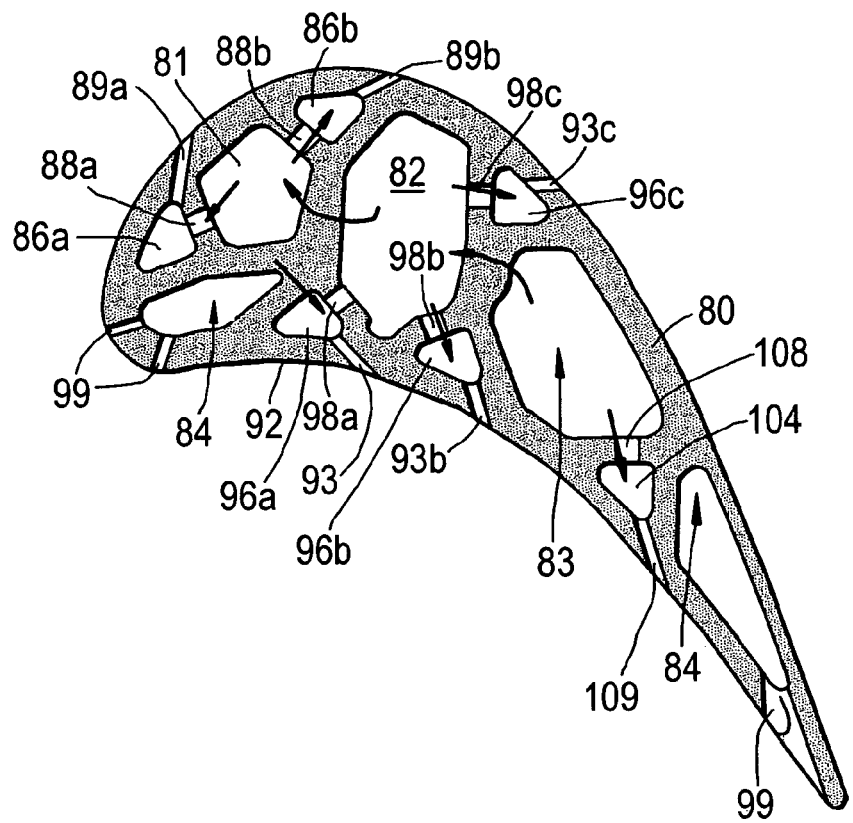
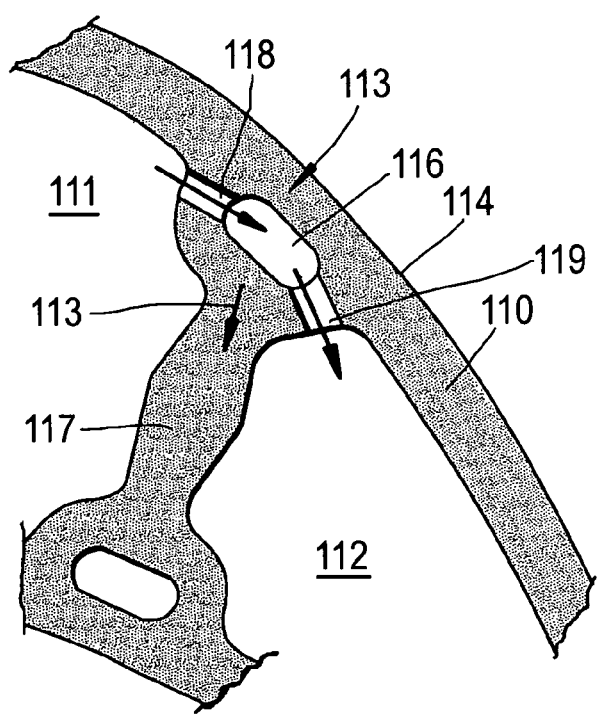

COOLING ARRANGEMENT

BACKGROUND

The present invention relates to a cooling arrangements and more particularly to cooling arrangements utilised in gas turbine engines, particularly with regard to turbine blades.

Referring to FIG. 1, a gas turbine engine is generally indicated at 10 and comprises, in axial flow series, an air intake 11, a propulsive fan 12, an intermediate pressure compressor 13, a high pressure compressor 14, a combustor 15, a turbine arrangement comprising a high pressure turbine 16, an intermediate pressure turbine 17 and a low pressure turbine 18, and an exhaust nozzle 19.

The gas turbine engine 10 operates in a conventional manner so that air entering the intake 11 is accelerated by the fan 12 which produce two air flows: a first air flow into the intermediate pressure compressor 13 and a second air flow which provides propulsive thrust. The intermediate pressure compressor compresses the air flow directed into it before delivering that air to the high pressure compressor 14 where further compression takes place.

The compressed air exhausted from the high pressure compressor 14 is directed into the combustor 15 where it is mixed with fuel and the mixture combusted. The resultant hot combustion products then expand through, and thereby drive, the high, intermediate and low pressure turbines 16, 17 and 18 before being exhausted through the nozzle 19 to provide additional propulsive thrust. The high, intermediate and low pressure turbines 16, 17 and 18 respectively drive the high and intermediate pressure compressors 14 and 13 and the fan 12 by suitable interconnecting shafts 26, 28, 30.

SUMMARY

In view of the above it will be appreciated that cooling of turbine elements for thermal compliance, whether they be rotor blades or nozzle guide vanes is important to ensure that adequate performance is achieved. Performance, whether measured in terms of efficiency or a specific output, is generally dependent upon turbine gas temperature. In such circumstances the ability to operate blades at higher temperatures will generally achieve higher performance. However, it is also important that the materials utilised are capable of operating at such temperatures. Thus rather than utilising exotic materials which may have other consequences with regard to cost and weight it is generally advisable to provide cooling.

Internal convection and external films are generally the techniques taken with regard to cooling blades. Blades are cooled using high pressure air from the compressor stages of the engine which bypasses the combustor and therefore is relatively cool compared to the combustion gas temperature. Nevertheless, extracting coolant flow has an adverse effect upon overall engine operating efficiency as such cooling air is not utilised for thrust.

It will be appreciated that the coolant air passes through cavities forming passages for coolant flow within the airfoil component. Recently it has been known to configure the cavity to improve cooling performance. One approach is to configure the walls that define the cavity to have diamond cross section webs. These diamond cross section webs position more of the component forming metal in the centre rather than at the periphery of the blade. This will reduce the mean metal temperature giving greater cooling effectiveness for a given coolant condition or mass flow. Furthermore, the improvement in cooling effectiveness is achieved with the same metal volume and with no increase in blade mass. Such an approach will improve generally component life as most of the load is carried by the internal webs and therefore the diamond web cross section improves strength structurally.

The above approach with regard to provision of diamond cross section internal webs however does not relieve one fundamental problem with regard to cooling variable components such as turbine blades or vanes in a gas turbine engine. Flow within the passages achieves convective cooling against the hot cavity wall surfaces. This cooling can be improved by the provision of trip strips and turbulators within the cavity. Once such convective cooling as occurred generally holes are machined into the aero foil wall to allow cooling air to exit onto the hot side of the aerofoil wall for cooling the external surfaces of the component. Such an approach is known as film cooling. Unfortunately the optimum condition with regard to film cooling is generally specified in terms of coolant flow blow rate. The optimum condition for convective cooling within the cavity of the component is generally not the same as the conditions for film cooling. Thus, generally in terms of design it is necessary to make a compromise. It would be advantageous to set the blow rate through the exit cavities to achieve better operational efficiency.

In accordance with the present invention there is provided an aerofoil for a blade or vane of a gas turbine engine, the aerofoil comprises two walls joined at a leading edge and a trailing edge and defining a cavity therebetween, the aerofoil further comprises a web extending between the walls and has a width w and joins one of the walls to defining a junction, a passageway is defined in the junction and has a width greater than w and is positioned in-line with a lateral axis of the web.

Preferably, the passageway extends either side of the web's width. Preferably, the web's width w is its minimum width.

Preferably, the web tapers towards the wall. Thus the web comprises a diamond cross section defining junctions at each wall with passageways therein.

Preferably, the passageway is elongate in cross-section having a longitudinal axis orientated within +/−30 degrees of the lateral axis of the web.

Preferably, the junction defines feed-holes extending between the cavity and the passageway and the wall defines bleed holes to an external surface of the wall thereby allowing cooling air to pass from the cavity, through the passageway and across the surface.

Preferably, there is a plurality of feed holes and bleed holes, wherein bleed holes and the feed-holes have different cross sectional areas. Furthermore, the aerofoil comprises an array of the feed-holes and/or bleed holes, along the length of the aerofoil, have differing cross sectional areas along the length of the passageway.

Preferably, the feed-holes are orientated to project fluid flow to generate a swirl fluid flow within the passageway.

Preferably, the bleed holes are orientated to act to engage the swirl fluid flow.

Alternatively, at least some of the bleed-holes extend into an adjacent cavity within the aerofoil.

In accordance with another aspect of the present invention there is provided a cooling arrangement for a gas turbine engine comprising a cavity in a component to define a passage for fluid flow, the cavity having cavity apertures and a wall to define the cavity, the arrangement wherein the cavity apertures extend to a chamber at a base portion of the wall and exit apertures extend from the chamber and are orientated relative to the chamber and/or all the cavity apertures for flow regulation across the chamber.

Typically, the component is an aerofoil. Generally, the aerofoil is a blade or vane for a gas turbine engine.

Typically, the wall has a diamond cross section to define a web between adjacent passages in the arrangement.

Possibly, the chamber has a round or lozenge or oval cross section.

Typically, the chamber extends along the component.

Typically, the cavity apertures are spaced along the length of the chamber. Typically, the exit apertures are spaced along the length of the chamber.

Typically, the cavity apertures and the exit apertures are orientated not to be aligned with each other.

Possibly the exit apertures and the cavity apertures have different cross sectional areas.

Typically, the cavity apertures and/or exit apertures have variable cross sectional areas along the length of the passage.

Possibly, the cavity aperture is orientated to project a coolant fluid flow to generate a swirl fluid flow within the chamber. Possibly, the exit apertures are orientated to act to engage the swirl fluid flow.

Possibly, at least some of the exit apertures extend into an adjacent cavity within the component.

Also in accordance with aspects to the present invention there is provided a gas turbine engine incorporating a cooling arrangement as described above.

BRIEF DESCRIPTION OF THE DRAWINGS

Aspects of the present invention will now be described by way of example and with the reference to the accompanying drawings:

FIG. 7 is a plan view for comparison with FIG. 2 in terms of cooling arrangements in accordance with aspects of the present invention; and FIG. 8 is a schematic plan cross section of a further aspect of the present invention.

DETAILED DESCRIPTION OF EMBODIMENTS

Figure 1:
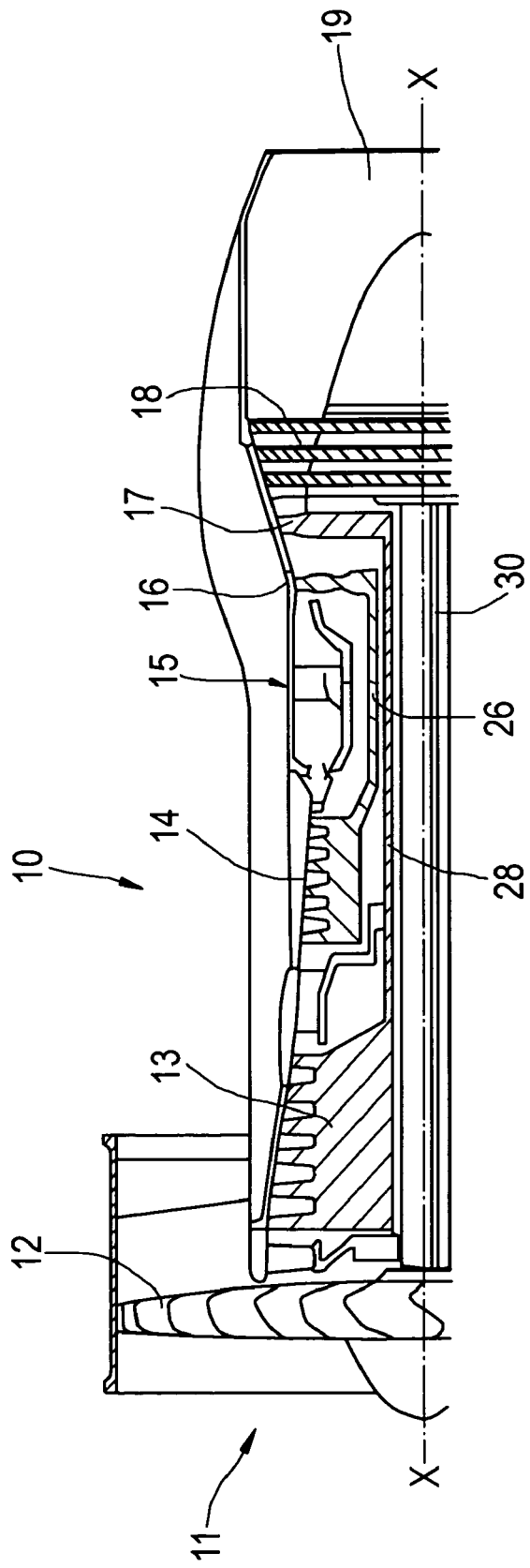
FIG. 1 is a schematic part section of a gas turbine engine incorporating an aerofoil described herein.
Figure 2:
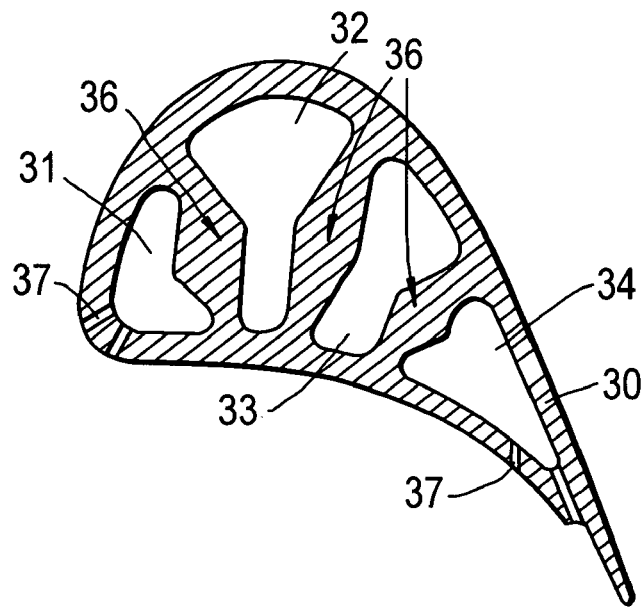
FIG. 2 is a schematic illustration of a conventional aerofoil component incorporating cavities.

As indicated above attempts have been made to improve cooling efficiency within aerofoil components. FIG. 2 provides a schematic cross section of an aerofoil component 30 in which a number of cavities 31, 32, 33, 34 are provided and divided by walls 36 in the form of diamond cross section webs. The cavities 31 to 34 provide and define passages through which a coolant flow passes in order to cool the component 30. As illustrated cavity apertures 37 are provided at positions along the aerofoil component 30 in order to develop a film cooling effect as described above.

Although a diamond cross section web or walls 36 improves cooling as indicated above and so efficiency and component life there is still a compromise between the flow conditions within the cavities 31 to 34 and provision of film coolant through apertures 37.

Figure 3:
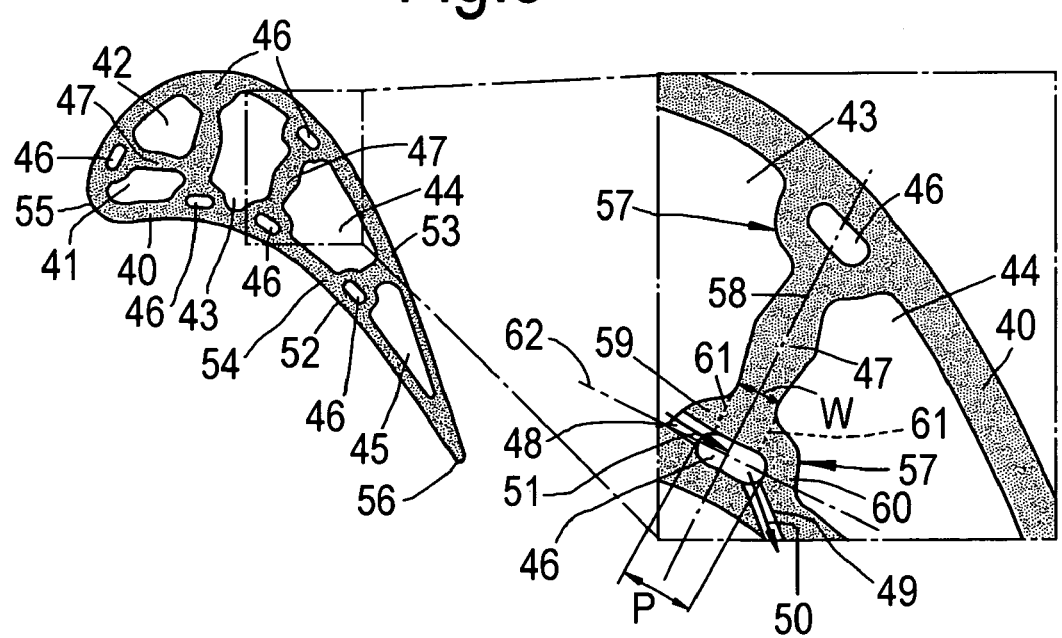
FIG. 3 is a schematic illustration of an aerofoil component with a section expanded to illustrate a cooling arrangement in accordance with first aspects of the present invention.

FIG. 3 provides a schematic illustration of a component 40 with an expanded section for illustration purposes with regard to aspects of the present invention. The component 40 incorporates a number of cavities 41, 42, 43, 44, 45 which act to define passages for a coolant flow in use. In accordance with aspects of the present invention chambers 46 are provided, towards the root or base end of a wall 47 and with cavity apertures 48 and exit apertures 49 there in. The apertures 48, 49 are orientated with regard to each other in order to regulate fluid flow in the direction of arrow heads 50, 51 in accordance with aspects of the present invention. In such circumstances it is possible to design an aerofoil 40 which more fully reconciles the varying conditions desirable for convective flow through passage in the cavities 41 to 45 and developing a film cooling effect upon external surfaces of the component 40.

As previously generally the walls 47 comprise webs which extend across the component 40 in order to define the cavities 41 to 45. As indicated above, such cross sectional shaping improves cooling effectiveness within the cavity with regard to convective effects from cooling flows.

The chambers 46 as indicated are generally towards the base of the walls 47 in root or junction parts. The chambers 46 act as chambers which extend along in a direction perpendicular to the plane of the drawing provided as FIG. 3. Cavity apertures 48 and exit apertures 49 can be presented at different space positions along the length of the chambers 46 depend upon requirements. In such circumstances the cavity apertures 48 effectively bleed off a coolant fluid flow from the main passage defined by cavities 41 to 44 at various positions along the length of the cavity 41 to 45 and/or chamber 46.

The bled off coolant flow into the chamber 46 in such circumstances undergoes flow conditioning such that the coolant flow 50 out of the exit aperture 49 is presented upon an external surface 52 of the component 40 in a more desirable condition.

The bleed flow in the direction of arrow head 51 in such circumstances can be more appropriately tailored to supply the optimum cooling flow blowing rate for film cooling through the exit aperture 49 in terms of fluid flow 50.

It will be noted in FIG. 3 that a number of chambers 46 are illustrated. It will be understood that the particular size of these chambers 46 and/or orientation of the respective cavity apertures 48/exit apertures 49 can be adjusted to achieve a desired flow rate for film cooling upon adjacent exit surfaces of the component 40. The particular cooling flow blowing rate can be optimised between chambers 46 and different parts of the component 40.

It will be understood that the bleed flow 51 effectively enters the chamber 46 and in such circumstances as indicated above the chamber acts for all bleed flows through all the cavity apertures. The size of the chamber in such circumstances as well as the orientation of the exit aperture will dictate the pressure ratio presented across the exit apertures 49. In order to achieve more optimum conditions it will be understood that the cross sectional area and shaping of the chamber 46 can vary along its length. In such circumstances the chamber 46 may taper from one end of the component 40 to the other and have a waisted or pinched cross sectional area progressively undulating along the length of the component 40. Such variations in the cross sectional area at different parts of the chamber 46 in such circumstances may condition the flow 50 through the exit aperture 49 to achieve better flow conditions for film cooling development.

A further means for adjusting the flow rate to desired requirements for developing film cooling and therefore achieving more optimised conditions for both current flow through the chambers defining the passages as well as film development may be achieved through any cross section of the cavity apertures and exit apertures relative to each other across the chamber as well as relative to other exit apertures and cavity apertures along the length of the component. Furthermore, the cross sectional area of the exit apertures and cavity apertures may vary along their length to regulate fluid flow into and out of the chambers. It will also be understood that the cavities will typically be straight but may also have a bent or undulating path to alter the flow rate and therefore cooling flow blowing rate through the exit aperture to develop film cooling.

Figure 4:
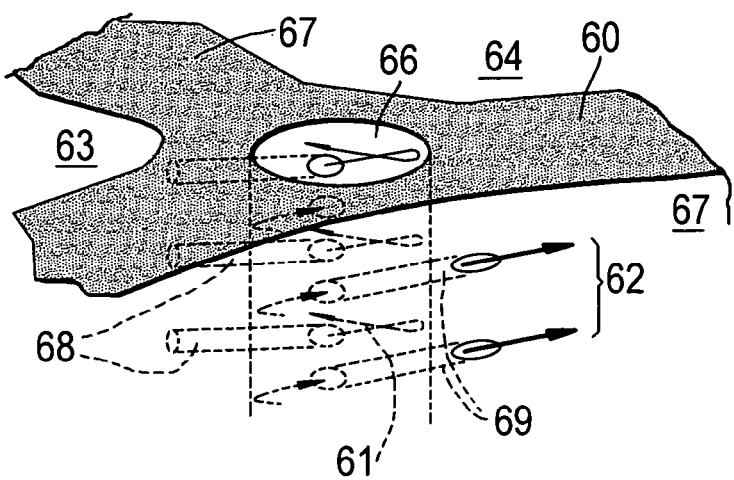
FIG. 4 is a schematic plan cross section of a second aspect of a cooling arrangement in accordance with aspects of the present invention.
Figure 5:
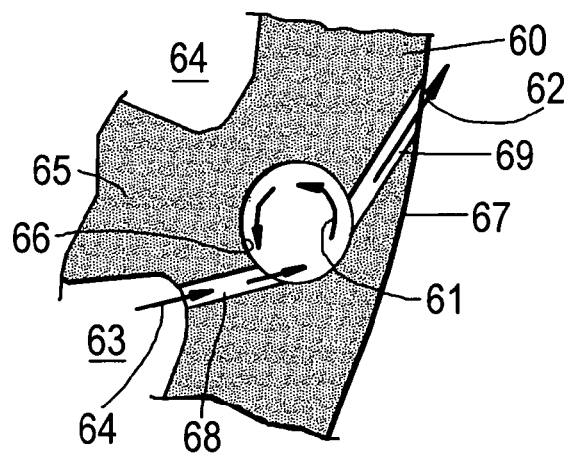
FIG. 5 is a schematic plan view of the arrangement as depicted in FIG. 4.

It will be understood that the chamber in association with the cavity apertures and exit apertures is arranged to allow conditioning of the cooling flow in particular the blowing rate through the exit aperture to develop film cooling. In such circumstances a further approach as described with regard to FIG. 4 and FIG. 5 is to generate a swirl fluid flow within the chamber. FIG. 4 provides a schematic side perspective view of a component 60 in which a chamber 66 is presented at the base or root of a wall 67. The chamber 66 has a number of cavity apertures 68 and a number of exit apertures 69 shown generally in broken line. In such circumstances a coolant flow from a cavity 63 generally is presented within the chamber 66 in order that a fluid flow swirl as depicted by arrow heads 61 is generated within the chamber 66. Such swirl is achieved by angular presentation of the cavity aperture 68 along a wall surface of the chamber 66. The exit apertures 69 are similarly angled in order to engage or scoop a proportion of the fluid flow swirls 61 for appropriate projection in the direction of arrow heads 62 and so generate film cooling against an exterior surface 67 of the component 60. In such circumstances an increased cooling effectiveness can be generated by the swirl fluid flow in the form of a vortex within the chamber 66. Such an approach can be referred to as "bubble cell" cooling and again facilitates better flow rate flowing through the exit apertures 69 to generate film cooling.

FIG. 5 provides a plan view of the arrangement as depicted in FIG. 4. In such circumstances as can be seen there is a fluid flow illustrated by arrow heads 64 which enters the chamber 66 and engages a wall surface of the chamber 66 in order to generate the vortex or swirl fluid flow 61 as illustrated. Generally, the exit apertures 69 are also presented at an angle to a wall surface of the chamber 66 but at a different height in the longitudinal direction of the chamber 66. In such circumstances the exit apertures 69 will scoop or engage the flow 61 in order to project an exit flow 62 to create film cooling on the surface 67. As previously, the cavity 63 is created by a wall 65 between the cavity 63 and an adjacent cavity 64. Generally as described previously it is advantageous if the wall 65 has a diamond web cross section.

By provision of a chamber in generally a base or root portion of the wall created by the webs between cavities defining flow passages in accordance with aspects of the present invention as indicated above designed possibilities are provided for determining the angle of orientation between the cavity apertures and the exit apertures. These cavity apertures and exit apertures are generally not aligned such that the chamber in such circumstances will regulate and adjust the flow through the exit aperture in order to facilitate a coolant blowing rate which is more acceptable for coolant film developments. Furthermore, the spacing, distribution and configuration and cross section of the respective cavity apertures, chamber and exit apertures can be adjusted for different effects at different parts of the component in order to create desired film cooling conditions which are more optimised and require less compromise in comparison with the flow conditions necessary for convective cooling within the cavities defining passages for fluid flow and cooling within the component generally.

A further advantage with regard to provision of chambers at root portions of the walls in accordance with aspects of the present invention is that these chambers inhibit inward heat flow from the external surfaces of the component. It will be understand that the chambers in accordance with aspects of the present invention effectively define further cavities within the component and define a void across which conductive heat flow must pass or go around in order to heat the web or portioning. In such circumstances the wall portion should remain cooler and therefore the potential for better cooling within the blade web itself is enhanced.

By aspects of the present invention improvements in cooling effectiveness should be achieved. The actual shape of the chamber as well as orientation and shaping whether straight, curved or upwardly or downwardly angled for the cavity exit aided apertures can all be adjusted for design operability with respect of achieving cooling effectiveness.

Figure 6:
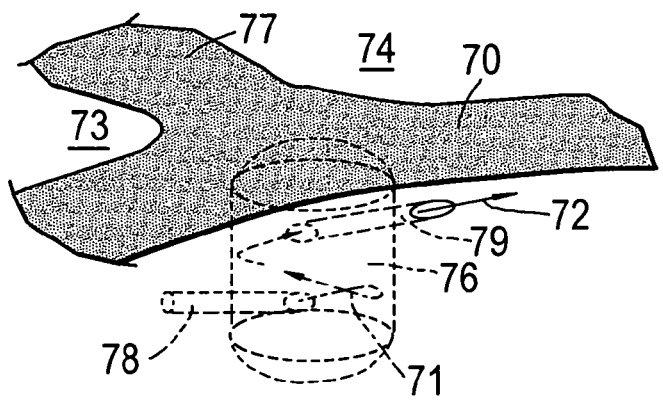
FIG. 6 is a schematic front perspective view of a second aspect of a cooling arrangement in accordance with aspects of the present invention.

FIG. 6 provides a further alternative with respect to aspects of the present invention. It will be recalled from FIG. 4 and FIG. 5 that chambers, with cavity apertures and exit aperture; extend substantially from a passage along the length of the component in a similar fashion to the cavity defining the primary passage for coolant flow within the component. An alternative as depicted in FIG. 6 is to provide radial cells. In such circumstances as depicted in FIG. 6 a component 70 has a wall 77 to define cavities 73, 74. A chamber 76 is created towards a root or base portion of the wall 77. The chamber 76 includes a cavity aperture 78 and an outer or exit aperture 79. In such circumstances the chamber 76 creates a closed chamber within which a fluid flow 71 can swirl within the chamber in order to present an exit flow 72 to facilitate better optimised flow rate conditions for film cooling effect.

A number of cells 76 can be created within the component 70 of differing sizes and dimensions in terms of cross section and shaping in order that the swirl flow 71 within the chamber 76 can be adjusted such that the exit flow 72 is appropriate.

As indicated above the wall in accordance with aspects of the present invention may have a diamond shaped web. It will be appreciated that walls may have very different configurations including flat although convex or concave shaping could also be utilised.

In accordance with aspects of the present invention chambers are used for presenting coolant flows from a main flow passage in order to reconcile the optimum flow conditions for convective coolant flow within the main cavities defining supply passages and exit flows for film cooling effects. In such circumstances the chambers can be varied in terms of shape, cross sectional area and number as well as position within a component in order to achieve a desired function or ease of manufacture. FIG. 7 provides a schematic cross section for comparison with the cross section as depicted in FIG. 2. Thus, an aerofoil component 80 proves a number of cavities, 81, 82, 83, 84.

Cavity 81 again provides a principal coolant flow passage within the component 80 and has two chambers 86a, 86b. Cavity apertures 88 extend from the cavity 81 into the chambers 86a, 86b respectively. These chambers 86a, 86b as previously defined voids within which coolant flow as depicted by the arrow heads is regulated in order to present through exit apertures 89a, 89b coolant flows for film cooling. Cavities 84 present passages for coolant flow but without chambers in accordance with aspects of the present invention. In such circumstances exit apertures which are provided directly from the cavities 84 to present coolant flow upon exterior surfaces 92. In such circumstances the coolant flows in the passages created by the cavities 84 are such that there is a degree of optimisation between these flows and the necessary coolant flows through the apertures 99 to create film cooling.

With regard to cavity 82 it will be noted that three chambers 96a, 96b, 96c are created. Thus, the main coolant flow through the passage created by the cavity 82 will be disbursed through cavity apertures 98 into the chamber 96. Thus, as described previously regulation between the necessary flow conditions within the cavity 82 for convective cooling and those flow conditions in terms of blow rate through an exit aperture 93 for film cooling can be reconciled.

With regard to cavity 83 again a main passage for coolant flow is created but with a single chamber 104 in accordance with aspects of the present invention. The chamber 104 has a cavity aperture 108 and an exit aperture 109. The shape, size and configuration of chamber 104 as well as the orientation and the configuration of the apertures 108, 109 will be chosen such that the flow conditions in the cavity 84 for convective cooling within that cavity can be reconciled with the necessary flow rate at the exit aperture 109 to develop film cooling on the surface 92.

In the above circumstances it will be appreciated that the number of chambers as well as their configuration, shape and orientation as well as provision of the cavity apertures and exit apertures that allows adjustment of the coolant flow conditions within the component 80 can be adjusted to achieve more optimised cooling efficiency in accordance with aspects of the present invention.

A further alternative as depicted in FIG. 8 is to provide a chamber 116 within a component 110 in which a cavity aperture 118 is presented to direct a fluid flow into the chamber 116. Whilst the chamber 116 has an exit aperture 119 which simply transfers the coolant flow to an adjacent cavity 112 from an initial cavity 111. It will be appreciated that generally there is a pressure gradient between the cavity 111 and the neighbouring cavity 112 such that flow is in the direction of the arrow heads. The direction of such flow will be dependant upon the pressure gradient which may be purely static or enhanced by centrifugal flows.

In any event, it will be appreciated that the chamber 116 does not present an exit aperture to an exterior surface 114 of the component 110 in order to develop film cooling. However, the aperture 116 will prevent inward conductive heating in the direction of arrow heads 113 to a wall or web parting 117. The chamber 116 in such circumstances provides a void preventing direct conductive flow to the wall 117 and therefore reducing the mean temperature of that wall 117. In such circumstances the effectiveness of coolant within the cavities 111, 112 may be improved.

The chambers in accordance with aspects of the present invention as indicated may have a limited length but will normally extend along the component in a similar fashion to the cavities defining the passages for coolant flow. In such circumstances termination of the chambers in accordance with aspects of the present invention may be accompanied by creating a leakage or dust hole through which fluid flow can leak into a low pressure point. Such an arrangement will ensure a continuous flow through the chambers in accordance with the present invention which will facilitate flow through the exit apertures in order to develop film cooling. An alternative would be to create an open end for the chambers such that the coolant flow in such circumstances would provide an additional coolant supply to a shroud for tip coolant of the aerofoil component in accordance with that aspect of the present invention.

Aspects of the present invention allow reconciliation between the flow characteristics necessary for coolant flow within the core passage cavities of an aerofoil component and the flow characteristics in terms of flow rate to create film cooling effects. Furthermore, through provision of the chambers at the root or base end of walls defining webs for cavities within the components it will be understood that these chambers dependent upon their size, orientation and distribution will act to block heat load transfer from an external surface of a component to internal portions of the wall. Such arrangements will reduce heating of the internal wall section which in addition to limiting necessary thickness of cross-sections will facilitate overall operational efficiency. It will also be understood that the wall portions of the component will become less stressed by high operating temperatures through the enhanced internal cooling effectiveness in according with aspects of the present invention.

Aspects of the present invention are particularly applicable to turbine blades within gas turbine engines and in particular high pressure turbine blades. However, aspects of the present invention may also be utilised with regard to other turbine blades such as intermediate turbine blades or guide vanes.

Generally cavities or passageways in accordance with aspects of the present invention as described above take a round cross-section as depicted in FIG. 5 or an oval or lozenge shape as depicted with regard to FIG. 3 and FIG. 8. In any event the particular shape will be chosen dependent upon operational requirements for achieving the heat blocking aspect as well as reconciling the flow rate conditions for current flow within the cavities defining the passage for coolant flow within the component and exit apertures. Generally the apertures, whether they be cavity apertures or exit apertures will be spaced along the length of the chamber and typically will not be aligned to avoid direct through flow.

A blade or vane of a gas turbine engine, as is well known in the art, comprises an aerofoil between a root portion and a blade tip portion. Referring to FIG. 3, the aerofoil 39 comprises two walls 53 and 54, usually referred to as the suction-side and pressure-side walls respectively, joined at a leading edge 55 and a trailing edge 56 and defining a cavity 41, 42, 43, 44, 45 therebetween. The aerofoil 39 further comprises a web 47 extending between the walls and has a width w and joins one of the walls to defining a junction 57. A coolant flow passageway 46 is defined in the junction 57 and has a width P greater than w and is positioned in-line with a lateral axis 58 of the web. By having such a width the junction's walls 59, 60 are thinner and longer than the prior art's web-to-wall junction and therefore there is greater heat loss which in turn reduces the amount of heat in the central portion of the load bearing web.

The coolant passageway 46 must be positioned in-line with the lateral axis 58 of the web; so that the lateral axis 58 crosses at least a part of the passageway. Ideally, the passageway extends either side of the web's width as shown in dashed lines 61. This is particularly relevant to the web's width w being a minimum width adjacent the junction.

This invention is not restricted to a diamond shaped web and may be used in conjunction with any shape, however, it is particularly useful in conjunction with a diamond shaped web or where the web tapers towards the wall.

As can be seen in FIG. 3, the passageway is elongate in cross-section having a longitudinal axis 62 orientated within +/−30 degrees of the lateral axis 58 of the web.

The walls 59, 60 of the junction define coolant feed-holes 48 extending between the cavity 43 and the passageway 46 and the junction wall 59, 60 or aerofoil wall 54 define bleed holes 49 to an external surface 52 of the wall 54 thereby allowing cooling air to pass from the cavity, through the passageway and across the surface.

The invention claimed is:

1. An aerofoil for a blade or vane of a gas turbine engine, comprising:
    two walls joined at a leading edge and a trailing edge and defining a cavity therebetween;
    a web extending between the walls and having a width w and joining one of the walls to define a junction; and
    a passageway defined in the junction and having a width p greater than the width w and being positioned in-line with a lateral axis of the web so that the lateral axis crosses at least a part of the passageway, wherein
        the web comprises a diamond cross section defining junctions at each wall, and
        one of the junctions defines a passageway therein.

2. The aerofoil of claim 1, wherein the passageway extends either side of the web's width.

3. The aerofoil of claim 1, wherein the web's width w is its minimum width.

4. The aerofoil of claim 1, wherein the web tapers towards the wall.

5. The aerofoil of claim 1, wherein the web joins both of the walls and defines the junction at each web-to-wall joint.

6. An aerofoil for a blade or vane of a gas turbine engine, comprising:
    two walls joined at a leading edge and a trailing edge and defining a cavity therebetween;
    a web extending between the walls and having a width w and joining one of the walls to define a junction; and
    a passageway defined in the junction and having a width p greater than the width w and being positioned in-line with a lateral axis of the web so that the lateral axis crosses at least a part of the passageway, wherein the passageway is elongate in cross-section having a longitudinal axis orientated within +/−30 degrees of the lateral axis of the web.

7. An aerofoil for a blade or vane of a gas turbine engine, comprising:
    two walls joined at a leading edge and a trailing edge and defining a cavity therebetween;
    a web extending between the walls and having a width w and joining one of the walls to define a junction; and
    a passageway defined in the junction and having a width p greater than the width w and being positioned in-line with a lateral axis of the web so that the lateral axis crosses at least a part of the passageway, wherein
        the junction defines feed-holes extending between the cavity and the passageway and the wall defines bleed holes to an external surface of the wall thereby allowing cooling air to pass from the cavity, through the passageway and across the surface, and
        an array of the feed-holes and/or bleed holes, along the length of the aerofoil, have differing cross sectional areas along the length of the passageway.

8. The aerofoil of claim 7, wherein there is a plurality of feed holes and bleed holes, wherein bleed holes and the feed-holes have different cross sectional areas.

9. An aerofoil for a blade or vane of a gas turbine engine, comprising:
    two walls joined at a leading edge and a trailing edge and defining a cavity therebetween;
    a web extending between the walls and having a width w and joining one of the walls to define a junction; and
    a passageway defined in the junction and having a width p greater than the width w and being positioned in-line with a lateral axis of the web so that the lateral axis crosses at least a part of the passageway, wherein
        the junction defines feed-holes extending between the cavity and the passageway and the wall defines bleed holes to an external surface of the wall thereby allowing cooling air to pass from the cavity, through the passageway and across the surface, and
        the feed-holes are orientated to project fluid flow to generate a swirl fluid flow within the passageway.

10. An aerofoil for a blade or vane of a gas turbine engine, comprising:
    two walls joined at a leading edge and a trailing edge and defining a cavity therebetween;
    a web extending between the walls and having a width w and joining one of the walls to define a junction; and
    a passageway defined in the junction and having a width p greater than the width w and being positioned in-line with a lateral axis of the web so that the lateral axis crosses at least a part of the passageway, wherein
        the junction defines feed-holes extending between the cavity and the passageway and the wall defines bleed holes to an external surface of the wall thereby allowing cooling air to pass from the cavity, through the passageway and across the surface, and
        the bleed holes are orientated to act to engage the swirl fluid flow.

11. An aerofoil for a blade or vane of a gas turbine engine, comprising:
    two walls joined at a leading edge and a trailing edge and defining a cavity therebetween;
    a web extending between the walls and having a width w and joining one of the walls to define a junction; and
    a passageway defined in the junction and having a width p greater than the width w and being positioned in-line with a lateral axis of the web so that the lateral axis crosses at least a part of the passageway, wherein
        the junction defines feed-holes extending between the cavity and the passageway and the wall defines bleed holes to an external surface of the wall thereby allowing cooling air to pass from the cavity, through the passageway and across the surface, and
    at least some of the bleed-holes extend into an adjacent cavity within the aerofoil.

* * * * *